July 23, 1963     M. A. PRICE     3,098,633
AIRCRAFT AUXILIARY FUEL TANK
Filed July 20, 1959
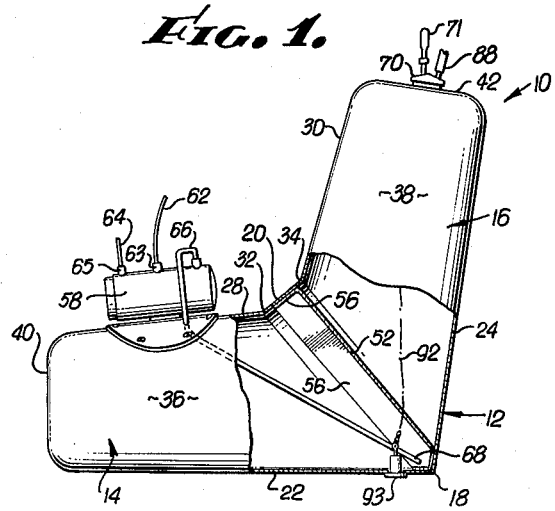
FIG. 1.
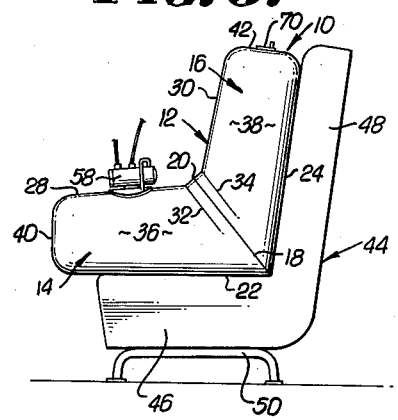
FIG. 5.
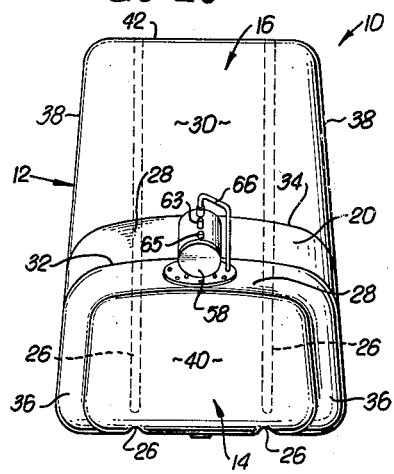
FIG. 2.
FIG. 3.
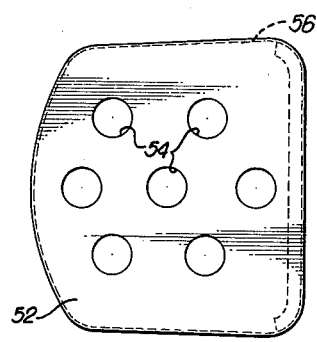
FIG. 4.
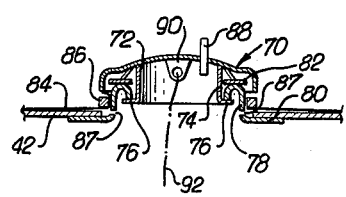
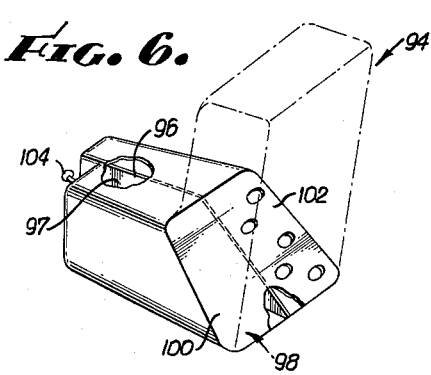
FIG. 6.
MARTIN A. PRICE
INVENTOR.
BY
ATTORNEY.

United States Patent Office 3,098,633
Patented July 23, 1963

3,098,633
AIRCRAFT AUXILIARY FUEL TANK
Martin A. Price, 514 N. Helberta, Redondo Beach, Calif.
Filed July 20, 1959, Ser. No. 828,370
4 Claims. (Cl. 244—135)

My present invention relates to auxiliary fuel containing devices, and it relates particularly to a novel auxiliary fuel containing device comprising a tank adapted to fit into a passenger seat of an aircraft or other vehicle, the tank having a generally V-shaped construction with a generally horizontal portion thereof resting on the bottom cushion portion of the vehicle seat, and a generally upright portion thereof resting against the seat back, the device being retained in this seated position by means of a strap such as a conventional aircraft safety belt engaged about the apex portion of the V-shaped tank.

Where one or more passenger seats in an aircraft or other vehicle are unoccupied, the craft is not normally carrying its capacity load, and hence is capable of carrying a greater fuel load to extend the range of the craft, provided suitable fuel tank space is available. However, extra fuel tank space is not normally available in many aircraft or other modern vehicles, so that advantage often cannot be taken of this extra load-carrying ability.

It is accordingly an object of my present invention to provide a range extender comprising an auxiliary fuel tank capable of being strapped into place in an otherwise empty passenger seat in aircraft or other vehicle, this fuel tank permitting an additional load of fuel over that normally carried in the tanks of the craft in an amount at least equal to the weight of a passenger who would otherwise use the seat.

Another object of the present invention is to provide a range extender of the character described comprising a tank adapted to fit into a passenger seat of an aircraft or other vehicle, the tank having a generally V-shaped construction with a generally horizontal portion thereof resting on the bottom cushion portion of the vehicle seat, and a generally upright portion thereof resting against the seat back, the device being retained in this seated position by means of a strap such as conventional aircraft safety belt engaged about the apex portion of the V-shaped tank.

Another object of my invention is a range extender of the character described which may be composed of a rigid material, such as laminated fiberglass impregnated by a polyester or epoxy resin, or which alternatively may be composed of a flexible pliable or flexible material, such as nylon cloth with an elastomer impregnation. If desired, the device may comprise inner and outer containers, either or both of which may be flexible.

It is a further object of my present invention to provide a range extender of the character described which is simple and sturdy in construction, which is quickly and easily placed in operative position and operatively connected to the aircraft or other vehicle, which may be easily jettisoned if desired, and which places the added load in a position in the craft designed to accommodate a similar load.

Other objects and advantages of my present invention will be apparent from the following description and claims, the novelty of my invention consisting in the features of construction, the combinations of parts, the novel relations of the members, and the relative proportioning, disposition and operation thereof all as is more completely described herein and as is more particularly pointed out in the appended claims.

In the accompanying drawings, forming a part of my present specification:

FIGURE 1 is a side elevation view, partly in section, of a presently preferred embodiment of my range extender.

FIGURE 2 is an end elevation view of the range extender shown in FIGURE 1.

FIGURE 3 is a plan view of my presently preferred perforated or apertured slosh bulkhead shown in section in FIGURE 1.

FIGURE 4 is a vertical section illustrating the filler cap and filler neck construction in a presently preferred form as employed in the top of the range extender of FIGURE 1.

FIGURE 5 is a side elevation view of the range extender shown in FIGURE 1 operatively positioned in an aircraft or other vehicle seat.

FIGURE 6 is a perspective view, with portions broken away and a portion in phantom, illustrating an alternative embodiment of the present invention embodying an oil supply.

Referring to my drawings, the presently preferred embodiment of my invention comprises a range extender 10 which includes a tank of suitable rigid or flexible material, the tank being generally designated by the numeral 12 and having two preferably symmetrical portions, a generally horizontally oriented portion 14 and a generally vertically oriented portion 16. The horizontal and upright portions 14 and 16, respectively, are integrally joined at a bonded joint 18, the joint 18 lying in an apex plane of the V-shaped tank 12 which substantially equally divides the angle included between the respective horizontal and upright tank portions 14 and 16.

An apex surface 20 is preferably provided between the respective horizontal and upright tank portions 14 and 16, the surface 20 extending equal distances on opposite sides of the bonded joint 18 and preferably being cylindrical as would be traced by a line perpendicular to a plane through the bonded joint 18.

If the tank 12 is composed of a rigid material, I have found that a suitable construction includes laminated fiberglass, such as three ply glass cloth, impregnated with a polyester or epoxy resin.

I prefer to provide a tank 12 which has a fuel capacity on the order of between 25 and 50 gallons, which keeps the fuel weight generally within the limits that can be readily accommodated in a conventional aircraft or other vehicle seat.

If it is desired to provide a tank 12 which is composed of a pliable or flexible material, so that the tank 12 can be stored when not in use without occupying much space, I have found that a suitable construction comprises nylon cloth with an elastomer impregnation.

If desired, a double wall construction may be provided for my tank 12, such double wall construction including either a rigid container with a soft bag on the inside or the outside thereof, or one soft bag inside the other. Such double wall construction gives an added measure of safety, and permits leakage or overflow drainage from the inner bag to be captured in the outer bag and drained off from the outer bag through a suitable drain tube.

The bottom of the generally horizontal tank portion 14 comprises a substantially flat bottom wall 22 which may, if desired, be contoured to fit any desired seat construction. Similarly, the back of the generally upright tank portion 16 comprises a substantially flat rear wall 24 which joins the bottom wall at the bonded joint 18. The wall 24 may be contoured as desired to fit any desired seat back construction. Walls 22 and 24 are preferably provided with longitudinal indentations 26 for improved rigidity, and also as flow channels if an outer bag is employed.

The horizontal tank portion 14 includes a rounded top wall 28, while the upright tank portion 16 includes a rounded forward wall 30, the walls 28 and 30 joining the apex wall 20 which receives the seat belt at respective juncture lines 32 and 34.

The tank portions 14 and 16 have respective side walls 36 and 38, and respective end walls 40 and 42.

In FIGURE 2 of the drawings the presently preferred range extender 10 is operatively disposed on a seat 44 which may be an aircraft or other vehicle seat. One or more of the seats 44 may be provided with range extenders 10 at the same time in the same aircraft or other vehicle, according to the number of available passenger seats. The bottom wall 22 of the range extender rests on the bottom cushion portion 46 of the seat 44, while the rear wall 24 of the range extender rests against the back cushion portion 48 of the seat 44. The seat 44 is mounted on a suitable mounting frame 50. It is to be noted that most passenger seats are constructed so that the bottom cushion 46 and back cushion 48 meet at an angle somewhat greater than 90°. I accordingly prefer to have the respective bottom and rear walls 22 and 24 of the range extender relatively disposed at an angle that is greater than 90°, a normally suitable angle being about 98°.

By providing generally upright tank portion 16 with a longitudinal center of mass set at an obtuse angle relative to the bottom surface 22 of the range extender, the device tends to fall backward into a firmly seated position in the seat 44. Then, by engaging the safety belt normally provided with aircraft seats, or other strap means where necessary, about the apex of the V-shaped range extender tank, the device is securely fixed in its operative position. It is to be noted that the seat cushioning provides an excellent shock absorber for the range extender.

I provide a slosh bulkhead 52 which is disposed inside of the tank 12 at the apex between the tank portions 14 and 16, the bulkhead 52 being preferably disposed generally parallel to a plane including the bonded joint 18. Bulkhead 52 is provided with apertures to permit restrained flow of fuel between the tank portions 14 and 16. The bulkhead 52 is provided also with a bonding flange 56 around its edge for integral bonding within the tank 12.

A fuel pump 58 is integrally mounted on a suitable support plate, which is attached to the rounded top wall 28 of the generally horizontal tank portion 14. The fuel pump 58 is preferably electrically driven, being provided with electrical power through lead 62 which may be removably operatively connected to the power supply for the aircraft or other vehicle. One convenient way for connecting lead 62 to the source of electrical power for the craft is to provide a cigarette lighter plug (not shown) at the free end of lead 62.

If desired, a quick-release connector 63 may be provided at fuel pump 58 for disengaging the lead 62 from pump 58.

The fuel outlet line 64 provides a fuel conduit from the pump 58 to a main fuel tank in the craft, and line 64 may be quickly releasable from the pump 58 at a fitting 65. Fuel is provided to pump 58 through pump intake tube 66, the sump end 68 of which is disposed near the juncture between the bottom and rear walls 22 and 24, respectively, at substantially the lowermost region in the tank 12 when the tank 12 is operatively disposed in a seat as in FIGURE 5.

Although various types of fuel caps may be employed without departing from the present invention, in FIGURE 4 I have shown one presently preferred form of fuel cap 70. The cap 70 has a cover member 72 with an inner, depending sleeve portion 74 having engaging lugs 76 extending outwardly in radial direction from its lower end. A filler neck 78 extends upwardly from an integral outwardly projecting radial flange portion 80 that is integrally connected to the upper end wall of the tank. If desired, this portion of the tank may be somewhat recessed to minimize protrusion of the filler neck 78 above the tank. A spring mounted sealing gasket 82 is carried in the cap 70, and seats in sealing engagement against the top of the neck 78 when the lugs 76 are engaged in the neck 78 by rotation of cap 70.

If it is desired, a flexible outer bag, such as a polyvinyl bag, designated by the numeral 84, may surround the tank 12, terminating at the neck 78 and fastened at the neck 78 by means of a suitable clamp 86, which may be a hose clamp. Bag 84 will serve to catch any fuel which leaks from the tank 12, and may be provided with a suitable drain tube leading from its bottom portion, such drain tube being composed of any suitable material, such as a flexible plastic, "Tygon" having been found satisfactory for this purpose. Overflow openings 87 may be provided in neck 78 below clamp 86 so that any overflow from the tank 12 will be received in bag 84.

A vent tube 88 may be provided through the top cover member 72 of the fuel cap 70. If desired, a flexible vent line, which may be composed of armored neoprene flexible aircraft tubing, may be connected to tube 88, and this may be extended outside of the body of the craft through a ventilator or the like. A similar vent conduit may lead from the bottom region of the flexible bag 84 to the outside of the body of the craft, when such a bag is employed.

A stud 90 depends from the inside of top cover member 72 of cap 70, the stud 90 supporting the upper end of a drain valve actuating chain 92. The lower end of chain 92 is operatively connected to the movable valve element of a drain valve 93 mounted in the bottom of tank 12. After releasing the cap 70 from the neck 78, an upward pull on the cap 70 will lift the chain 92, opening the valve 93 to permit the fuel to drain out of the tank 12. Fuel released through valve 93 will be drained out of the craft through the flexible bag vent tube where a flexible bag 84 is employed, or through a separate vent tube where the bag 84 is not used. The valve 93 is spring loaded, so that when the upward pull is removed from chain 92, the valve 93 will automatically close.

It is often desirable to operatively connect a carbon dioxide bottle or air pressure source to tank 12, to provide carbon dioxide or air under low pressure within tank 12, as the fuel lowers in the tank, to replace the fuel fumes with a non-flammable gas. Such carbon dioxide bottle may be carried in the cap 70, as at 71 in FIGURE 1, if desired, or may otherwise be positioned with respect to tank 12. No transverse holes should be provided as at 87 when the carbon dioxide bottle is employed.

A carbon dioxide bottle or air pressure source may similarly be employed in connection with two-walled soft or flexible tank constructions in order to keep the tank in its fully expanded shape regardless of the fuel load in the tank and to provide fuel transfer pressure to the fuel in the inner tank portion. In this instance it is preferable to provide the carbon dioxide or air pressure in the space between the flexible tank walls under a pressure of from atmospheric pressure to about 20 p.s.i. above atmospheric pressure.

In FIGURE 6 I have illustrated an alternative embodiment of my invention wherein the tank 94 has a longitudinally arranged dividing bulkhead in the lower, generally horizontally disposed portion of the tank, the bulkhead 96 being a solid one which walls off a separate oil tank 97 to provide a reservoir for motor oil. The slanting center bulkhead 98 is provided with one solid side 100 on the side of the longitudinal bulkhead 96 forming the oil tank 97. In this manner, the oil tank 97 is completely isolated from the remainder of the tank 94. The other side 102 of the diagonal bulkhead 98 is perforated, so that the remainder of the tank 94 forms a fuel reservoir in the same manner as the preferred embodiment of the invention. Suitable oil pump means 104 may be employed to pump the oil from oil tank 97 to the desired location in the craft. If desired, where both outer and inner tank walls are provided, the space between these walls may be employed as a second compartment, for containing oil or other liquid.

It will be apparent that I have provided a highly versatile range extending device which may be quickly and easily installed and removed, and jettisoned if desired, and which is perfectly safe in operation. It is disposed at the optimum position in aircraft for preserving the desired center of gravity (this being of extreme importance in such craft as helicopters). The only change which need be made in a conventional aircraft is that a T fitting should be placed in a line to a fuel tank so that fuel from my range extender may be introduced into a tank of the craft. Snap-in fittings make for safe and quick connections.

I have found that in 2-seat aircraft, the range can often be more than doubled by the use of one of my range extenders, and that in 4-seat executive type aircraft, two of my range extenders in the two rear seats will usually double the range of the craft. This tremendous increase in performance is accomplished without at all disturbing the normal rated loading and load distribution in the craft.

The tank in accordance with my invention is particularly safe where a carbon dioxide bottle or air replaces fuel fumes with the gas or air. As an added precaution on this safety feature, if desired, when the tank is empty of fuel, all vents may be disengaged from the tank by means of quick-disconnect couplings embodying check-valves, whereby the carbon dioxide or fresh air will be retained in the tank.

Although I have illustrated my device with bottom and upright tank portions 14 and 16 of substantially equal length, it will be understood that they may be substantially unequal in length. For example, the upright portion 16 may be substantially longer than the bottom portion 14, to form an L-shaped tank. The term "V-shaped" as employed herein and in the appended claims is therefore to be considered as including such an L-shaped construction.

It may be desirable to employ conventional shoulder straps to assist in retaining my range extender in place, particularly where such L-shaped construction is used.

While the tank 12 may be formed with a joint at the apex of the tank, as at 18, it is to be understood that the tank may be otherwise formed by joining two sections together; for example, a joint may extend centrally around the sides 36 and 38 and the ends 40 and 42, if desired.

If it is desired, a transparent or translucent material may be employed in the tank walls for visual observation of the fuel level.

Also, in the case of both outer and inner tank walls, if it is desired a bullet sealing material may be enclosed between them.

It is to be understood that the form of my invention herein shown and described is my preferred embodiment and that various changes in the shape, size and arrangement of parts may be resorted to without departing from the spirit of my invention, or the scope of my appended claims.

I claim:

1. An aircraft auxiliary fuel tank adapted to be mounted and retained in an aircraft seat having bottom and back portions, said tank comprising a generally horizontal lower section which includes a generally flat bottom wall mountable on the seat bottom, side, forward and top walls, and a generally vertical upper section extending upwardly from said lower section, said upper section including a generally flat back wall mountable against the seat back, side, forward and top walls, the two sections being hermetically joined at a waist section, the three sections forming an L shape in side profile and providing a unitary closed and hermetically impervious container, and the waist section having a girth adapting it to encirclement by a conventional aircraft seat belt with the seat belt extending from below and behind the tank upwardly on opposite sides of the tank and around said waist section.

2. An aircraft auxiliary fuel tank as defined in claim 1 wherein said tank is composed of rigid material.

3. An aircraft auxiliary fuel tank as defined in claim 1 wherein said tank is composed of flexible material and is collapsible, so that as fuel is withdrawn from the tank the tank will collapse to an internal volume commensurate with the remaining fuel volume in the tank and air will not enter the tank to replace the withdrawn fuel.

4. An aircraft auxiliary fuel tank as defined in claim 1 wherein said back wall is disposed at an obtuse angle with respect to said bottom wall.

References Cited in the file of this patent

UNITED STATES PATENTS

| | | |
|---|---|---|
| 694,305 | Branch | Feb. 25, 1902 |
| 1,485,975 | Geiglein | Mar. 4, 1924 |
| 1,655,342 | Spears | Jan. 3, 1928 |
| 1,662,018 | Van Orman | Mar. 6, 1928 |
| 1,878,063 | Todd | Sept. 20, 1932 |
| 1,895,976 | Dornier | Jan. 31, 1933 |
| 2,338,450 | Martin | Jan. 4, 1944 |
| 2,404,418 | Walker | July 23, 1946 |
| 2,437,058 | Waters | Mar. 2, 1948 |
| 2,439,562 | Cunningham | Apr. 13, 1948 |
| 2,780,922 | Johannesen | Feb. 12, 1957 |

FOREIGN PATENTS

| | | |
|---|---|---|
| 3,657,579 | Great Britain | Feb. 25, 1932 |